United States Patent [19]
Shen et al.

[11] Patent Number: 5,672,296
[45] Date of Patent: *Sep. 30, 1997

[54] POLARIZER FILMS COMPRISING WHOLLY AROMATIC LIQUID CRYSTALLINE POLYMERS AND DICHROIC DYES

[75] Inventors: Sunny S. Shen, Holmdel; Hyun Nam Yoon, New Povidence, both of N.J.; Mohammad Mortazavi, Sunnyvale, Calif.

[73] Assignee: Hoechst Celanese Corp., Somerville, N.J.

[ * ] Notice: The portion of the term of this patent subsequent to Jun. 2, 2015, has been disclaimed.

[21] Appl. No.: 460,288

[22] Filed: Jun. 2, 1995

[51] Int. Cl.$^6$ .................. C09K 19/52; C09K 19/56; F21V 9/14; G02F 1/1335
[52] U.S. Cl. .................. 252/299.01; 252/299.1; 252/299.4; 252/299.5; 252/585; 349/96; 428/1
[58] Field of Search .............. 252/299.1, 299.4, 252/299.5, 585; 349/96; 428/1

[56] References Cited

U.S. PATENT DOCUMENTS

| | | | |
|---|---|---|---|
| 4,824,882 | 4/1989 | Nakamura et al. | 524/89 |
| 4,840,640 | 6/1989 | Miura et al. | 8/506 |
| 4,842,781 | 6/1989 | Nishizawa et al. | 264/1.3 |
| 5,054,888 | 10/1991 | Jacobs et al. | 359/76 |
| 5,059,356 | 10/1991 | Nakamura et al. | 252/585 |
| 5,071,906 | 12/1991 | Tanaka et al. | 524/557 |
| 5,310,509 | 5/1994 | Okada et al. | 252/585 |
| 5,318,856 | 6/1994 | Misawa et al. | 428/524 |
| 5,340,504 | 8/1994 | Claussen | 252/585 |

FOREIGN PATENT DOCUMENTS

| | | | |
|---|---|---|---|
| 0 428 213 A1 | 11/1989 | European Pat. Off. | G02B 27/28 |
| 0 348 964 A3 | 1/1990 | European Pat. Off. | G02B 5/30 |
| 0 397 263 A1 | 11/1990 | European Pat. Off. | C09K 19/38 |
| 63-195602 | 8/1988 | Japan . | |
| 04288503 | 10/1992 | Japan . | |

*Primary Examiner*—Shean C. Wu
*Attorney, Agent, or Firm*—Palaiyur S. Kalyanaraman

[57] ABSTRACT

This invention provides novel liquid crystalline polymers which, when mixed with a suitable dye and extruded, yields polarizer films with superior polarizing efficiency, transmittance, dichroic ratio, and thermal and humidity stability. The invention further provides a process to prepare such polymers and polarizer films therefrom.

22 Claims, No Drawings

POLARIZER FILMS COMPRISING WHOLLY AROMATIC LIQUID CRYSTALLINE POLYMERS AND DICHROIC DYES

BACKGROUND OF THE INVENTION

Polarizers are important components of liquid crystal displays. Liquid crystal displays (LCDs) are widely used components in applications such as, for example, Notebook Personal Computers (PCs), calculators, watches, liquid crystal color TVs, word processors, automotive instrument panels, anti-glare glasses and the like. Typically, polarizers are used in the form of film, the polarizer film (also called polarizing film). In an LCD, the liquid crystal elements are generally sandwiched between two layers of polarizing films which regulate the incident light that enters the liquid crystal producing an on-and-off contrast.

The polarizing film traditionally comprises a stretched polymer film such as, for example, polyvinyl alcohol (PVA), a colorant and other optional layers. The colorant is usually iodine or a dichroic dye that is absorbed on the polymer film. This arrangement may then be coated or sandwiched on both sides with a substrate such as, for example, polyethylene terephthalate (PET), polymethyl methacrylate (PMMA), triacetyl cellulose (TAC), and the like. This may further be coated with an adhesive layer, protective layer, and the like.

The nature and quality of the polarizing film influences the performance of the polarizer as well as the device wherein the polarizing film is used. Traditional polarizing films such as stretched PVA are increasingly found to be inadequate in performance. Their limitations have become apparent with increasingly sophisticated applications for polarizers and LCDs. More and more, the environment for use of these materials is becoming increasingly harsher in terms of temperature, humidity and the like. PVA films lack the needed heat and humidity resistance, strength, dependability, ease of use and ease of processing. Furthermore, they frequently suffer from deterioration of optical properties, such as a decrease in polarizing efficiency when exposed to high humidity/heat environment. Accordingly, improved polarizing films are urgently required to satisfy increasingly sophisticated applications.

Several attempts have been made to improve the quality and performance of polarizer films with limited success. U.S. Pat. Nos. 5,310,509 and 5,340,504 disclose polarizing films based on water-soluble organic polymers such as polyvinyl alcohol and dichroic dyes. U.S. Pat. Nos. 4,824,882 and 5,059,356 disclose polyethylene terephthalate ("PET") films for polarizer applications. U.S. Pat. No. 5,318,856 discloses films of polyvinyl alcohol, polyvinyl formal, polyvinyl acetal and polyvinyl butyral. U.S. Pat. No. 4,842,781 discloses films of polyvinyls, polyester and polyamides. These polymers, however, still have the same disadvantages of PVA, especially in thermal and humidity resistance.

U.S. Pat. No. 5,071,906 discloses a polarizing film comprising a uniaxially stretched PVA having a degree of polymerization of about 2,500–10,000, and a colorant. While this is a slight improvement over traditional lower molecular weight PVA, it still suffers from the disadvantages of PVA. Furthermore, the film will still have to be stretched to achieve orientation.

It is known that liquid crystal polymers do not need to be stretch oriented. The process of molding or extrusion generally achieves high degree of orientation in such polymers. For this reason, liquid crystal polymers would be ideal candidates for polarizer substrate film applications. For example, Japanese patent application JP 62-28698 (filed Feb. 10, 1987) discloses a polarizing film consisting of a thermotropic liquid crystal polyester film with a dichroic coloring matter dyed and oriented, wherein the polymer is a copolyester of a hydroquinone derivative (A), a terephthalic acid ingredient (B), an isophthalic acid ingredient (C) and a parahydroxybenzoic acid ingredient (D), with the molar ratio of A to D being in the range 5:95 to 70:30% and the molar ratio of B to C being in the range 50:50 to 100:0%. The disclosed polymer compositions are difficult or nearly impossible to make. Additionally, the monomer ratios disclosed for those polymers do not necessarily yield a balanced formula for preparing liquid crystalline polymer compositions. Moreover, if even one could make such polymers, any films from such polymers are likely to be substantially deficient in optical transparency, orientation and heat/moisture resistance, which therefore would limit and/or prevent any potential utility as polarizing films, especially in stringent environments.

U.S. Pat. No. 4,840,640 discloses the use of "liquid crystalline polyethylene terephthalate-parahydroxybenzoic acid," formed by copolymerizing a polyethylene terephthalate component (A) with a parahydroxybenzoic acid component (B) with the A:B molar ratio being in the range 40:60 to 5:95. Optical properties are a concern with such compositions. Such compositions have to be first blended with a dichroic acid and then formed into a film through a die at a high shear rate to achieve satisfactory film orientation and transparency. Insufficient transmittance of the light at the wavelength employed would preclude use of films from such polymers for polarizer applications. Perhaps because of such limitations of these "improvements," films based on PVA are still the only ones commercially available for polarizer uses, despite their own disadvantages mentioned earlier.

Accordingly, it is an object of this invention to provide a substantially improved polarizing film useful for existing as well as sophisticated applications.

It is another object of this invention to provide a liquid crystal polymeric film useful for polarizer applications.

It is an additional object of this invention to provide liquid crystal polymer compositions that can be blended with suitable dyes and then formed into films useful for polarizer applications.

It is yet another object of this invention to provide liquid crystalline polymers which can form films with high orientation, optical transparency, moisture resistance and heat resistance with minimal processing needs.

It is a further objective of this invention to provide liquid crystalline polymers which can be dyed and processed at high temperatures to provide polarizing films with high orientation, dichroic ratio and polarizing efficiency.

SUMMARY OF THE INVENTION

One or more of the objects of the present invention are accomplished by the provision of a polarizing film which possesses a polarizing efficiency of at least 70%, and comprises a blend of (a) a film-forming, wholly aromatic thermotropic liquid crystalline polymer ("LCP"), and (b) a suitable dichroic dye. The LCP may be a polyester, polyamide, polyesteramide, polyketone, polycarbonate, polyurethane, polyether and the like. A preferred LCP is a polyester or a polyesteramide. An inventive liquid crystalline polymer comprises repeat units corresponding to the formula:

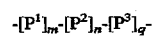

wherein $P^1$ is an aromatic hydroxy monocarboxylic acid or an aromatic amino carboxylic acid; $P^2$ is an aromatic dicarboxylic acid; $P^3$ is a phenolic compound; m, n and q represent mole percent of the respective monomers, with m+n+q totalling 100 mole percent. While m, n, and q may generally range from 5–70% individually, the preferred range of m is about 5–40%, n is about 5–40% and q is about 5–30%. In addition to $P^1$, $P^2$ and $P^3$, additional monomeric moieties such as, for example, a second aromatic amino carboxylic acid moiety or an aromatic hydroxy carboxylic acid moiety -[$P^4$]$_r$-, a diphenol moiety -[$P^5$]$_s$, and the like, may be part of the polymer repeat unit, in which case r is about 5–20 mole%, and s is about 5–20 mole%, with the total m+n+q+r+s being adjusted to be 100 mole %. $P^4$ is different from $P^1$ and $P^5$ is different from $P^3$. By suitable choice of monomers for $P^1$, $P^2$, $P^3$, $P^4$ and $P^5$ and for any other additional moieties, as well as their mole percents, the invention provides LCPs with the above-mentioned substantially improved polarizer characteristics and uses.

The invention further provides a process to make such compositions.

DESCRIPTION OF THE PREFERRED EMBODIMENTS

In one embodiment, the present invention discloses polarizing films with high orientation, optical clarity, dichroic ratio, polarizing efficiency, and humidity/heat resistance. The term "high orientation" refers to orientation of at least 90%. The term "high optical clarity" refers to amorphousness and is measured by light transmission of at least 30% in the wavelength range 350–750 nm. The term "high dichroic ratio" refers to ratio of at least 8 and "high polarizing efficiency" refers to polarization efficiency of at least 70%. The term "high humidity/heat resistance" refers to no substantial change in the optical properties of the film when the film is exposed to environmental conditions of at least about 90% humidity and temperatures of at least about 90° C. for at least about 100 hours.

The inventive polarizing films are obtained from blends of inventive LCP compositions and suitable dichroic dyes. The inventive LCP compositions are film-forming, wholly aromatic thermotropic liquid crystalline polymers which may be liquid crystalline polyesters, polyamides, polyesteramides, polyketones, polycarbonates, polyurethanes, polyethers and the like. Preferred LCP is a film-forming, wholly aromatic thermotropic liquid crystalline polyester or a polyesteramide. A typical preferred polymer is characterized by the repeat units:

-[$P^1$]$_m$-[$P^2$]$_n$-[$P^3$]$_q$- wherein $P^1$, $P^2$, and $P^3$ are as described above. Examples of $P^1$ include, but are not limited to, monomers such as 4-hydroxybenzoic acid, 2-hydroxy-6-naphthoic acid, 4-aminobenzoic acid and 4-carboxy-4' hydroxy-1,1'-biphenyl. Examples of $P^2$ include, but are not limited to, terephthalic acid, isophthalic acid, phthalic acid, 2-phenylterephthalic acid, 1,2-naphthalene dicarboxylic acid, 1,4-naphthalenedicarboxylic acid, 2,6-naphthalene dicarboxylic acid and 4,4'-biphenyldicarboxylic acid. Examples of $P^3$ include, but are not limited to, resorcinol, hydroquinone, methyl hydroquinone, phenyl hydroquinone, catechol, 4,4'-dihydroxybiphenyl, and acetaminophen. Additional monomers such as a second hydroxy carboxylic acid or a second amino carboxylic acid $P^4$, a diphenol $P^5$, and the like may also be part of the polymeric repeat unit; $P^4$ is different from $P^1$, and $P^5$ is different from $P^2$. Examples of $P^4$ include, but are not limited to, 4-hydroxybenzoic acid, 2-hydroxy-6-naphthoic acid, 4-aminobenzoic acid and 4-carboxy-4'hydroxy-1,1'-biphenyl. Examples of $P^5$ include, but are not limited to, resorcinol, hydroquinone, methyl hydroquinone, phenyl hydroquinone, catechol, 4,4'-dihydroxybiphenyl and acetaminophen. When there are five such monomers listed above, the monomers $P^1$, $P^2$, $P^3$, $P^4$ and $P^5$ are present in amounts of 5–40%, 5–40%, 5–30%, 5–20 and 5–20 mole percent respectively. Still additional monomers such as, for example a third diphenol, a third hydroxy carboxylic acid or a third aminocarboxylic acid and the like, may also be present in the repeat unit in suitable amounts. In selecting monomers and their quantities, care should be taken not to sacrifice the desired properties of the polymer. Suitable choice of monomers and their respective amounts leads to the inventive polymers with desired properties.

The invention may be illustrated by the liquid crystalline polyester, hereinafter referred to as "COTBPR", prepared from the monomers 4-hydroxybenzoic acid ("HBA") for $P^1$, 6-hydroxy-2-naphthoic acid ("HNA") for $P^2$, terephthalic acid ("TA") for $P^3$, 4,4'-biphenol ("BP") for $P^4$ and resorcinol ("R") for $P^5$ in its repeat unit in the ratio 30:30:20:10:10 respectively. Preparation of the LCP composition may be done by any known method. In a typical synthesis, the above-noted five monomers in their respective mole ratios are mixed in a suitable apparatus containing a suitable distillation head. The contents are kept in an inert atmosphere while a catalyst such as, for example, potassium acetate, and a solvent such as, for example, acetic anhydride are added to the ingredients and the mixture is heated and stirred in an oil bath. The temperature is raised high enough for acetic acid to distill over. After almost all acetic acid has been possibly removed, the apparatus is evacuated when polymer COTBPR forms as a polymer melt. As any remaining acetic acid distills over, the viscosity keeps increasing. The apparatus is then cooled to, for example, ambient temperature, when the desired COTBPR is isolated.

The polymer may be analytically characterized by measuring polymer properties such as inherent viscosity ("I.V."), melt viscosity ("MV"), as well as by other techniques such as differential scanning calorimetry ("DSC"), thermogravimetric analysis ("TGA"), NMR, IR and the like conventional methods well known to those skilled in the art. I.V. may be defined as:

$I.V.=\ln(\eta_{rel})/c$ where c is the concentration of solution (0.1 wt %), and $\eta_{rel}$=relative viscosity. The relative viscosity may be measured by dividing the flow time in a capillary viscometer of the polymer solution by the flow time of the pure solvent. DSC gives a good indication of the glass transition temperature ($T_g$) while hot stage optical microscopy measures the liquid crystalline phase change and the anisotropy of the melt. In a typical preparation of COTBPR with the above-noted molar ratios, the polymer had an I.V. of 2.0–2.4 dl/g as determined in a pentafluorophenol solution of 0.1 weight percent concentration at 60° C. and a MV of about 700–1, 700 poise at a shear rate of $10^3$ $sec^{-1}$ measured at 230° C. in a capillary rheometer using an orifice of 1 mm diameter and 30 mm length. The $T_g$ as measured by DSC (10° C./min heating rate) was about 106° C. and the solid-to-liquid crystalline transition ($T_{s-lc}$) at about 170° C. with the polymer melt being optically anisotropic.

By varying the chemical nature of the monomers $P^1$, $P^2$, $P^3$, $P^4$ and $P^5$, and their amounts in the polymerizations, several LCPs could be prepared, as described in the EXAMPLES section below.

An embodiment of the present invention includes polarizing films made with the inventive liquid crystalline polymers. The polymer may be blended with colorants such as iodine, or preferably organic dichroic dyes, to produce a composition to form polarizing film therefrom. Suitable dichroic dyes include, but are not limited to, straight chain dyes, branched dyes, direct dyes, disperse dyes, acidic dyes and the like. Yellow, orange, blue, purple or red dyes are all suitable. Several classes of suitable dyes are well known to those skilled in the art. They include, but are not limited to azo dyes, anthraquinone dyes, commercially available Disperse dyes such as Blue 214, Red 60 and Yellow 56, direct dyes such as Black 17, 19 and 154, Brown 44, 106, 195, 210, 242 and 247, Blue 1, 15, 22, 78, 90, 98, 151, 168, 202, 236, 249, and 270, Violet 9, 12, 51, and 98, Green 1 and 85, Yellow 8, 12, 44, 86, and 87, Orange 26, 39, 106 and 107, and Methylene violet Bernthsen (available from Aldrich Chemical Company, Milwaukee, Wis.). More than one compatible dyes may also be used, if so desired, as well as a combination of iodine and one or more dichroic dyes. The choice of suitable dichroic dye or dyes depends on several factors, as is well known to those skilled in the art. Some such factors include, but are not limited to, light fastness and migration in the polymer. Another desirable property is that the transition moment of the dye and molecule main axes should have the same direction.

If iodine is to be used as the sole colorant, a conventional method to incorporate iodine to form a polarizer is to first form a film of the LCP by a suitable method (such as, for example, extrusion, die casting, spin coating, and the like), and then immerse the film into a solution of iodine in a suitable solvent in suitable concentration. A preferred method is to use an aqueous solution of a mixture of iodine and potassium iodide. This solution may further contain a suitable crosslinking agent such as boric acid, borax or glutaraldehyde, as is well known to those skilled in the art.

The present invention, however, prefers a dichroic dye as the colorant instead of iodine. When a dichroic dye is used as the colorant, a similar procedure (to iodine incorporation) may be followed, wherein a film of the polymer is formed by a suitable process and then dipped into a solution of the dye in a suitable solvent in a suitable concentration. A preferred method, however, is to physically blend the polymer and the dye at a suitable temperature, e.g., ambient temperature, and then form the film from the blend by a suitable method. A more preferred method, however, is to melt-blend a mixture of both the liquid crystalline polymer and the colorant (blending the two together at temperatures above ambient, preferably at or near the melting temperature of the polymer), prior to film formation, into an extrudable mixture and then extrude the mixture at a suitable temperature into a film. This method yields an uniformly dispersed dye in the polymer film. This preferred method is made possible by the uniqueness of the inventive LCPs which have good and stable thermal characteristics that make them ideally suitable for melt processing operations. Thus, for example, the above-described COTBPR and a suitable dye may be taken together in a suitable mixer and heated to a suitable temperature, for example at around 200° C. and blended thereat to form a well blended mixture. This mixture may be charged into a suitable melt extrusion apparatus, melted and the melt then extruded to a suitable dimension polarizer film. This process has the added advantage that film dimensions can be easily changed by changing the extrusion die accordingly. The choice of a suitable dye or dyes has relevance in this process of melt blending and extrusion. Since melt blending and extrusion are at fairly high temperatures, the dye and the polymer have to possess adequate thermal stability at such temperatures. The inventive polymers fit that requirement very well. The process also takes advantage of the high orientation achievable from such liquid crystalline polymers.

Characterization of the inventive polarizer film may be performed by well known methods skilled in the art. Polarizer films prepared according to the present invention have high orientation, high thermal and humidity resistance and also possess excellent optical characteristics such as light transmittance and polarizing coefficient in the wavelength desired. The desired wavelength generally depends on the colorant selected. In a typical experiment, for example, a COTBPR film prepared as described above was melt-blended with Methylene Violet Bernthsen dye at about 240° C. and the blend was then melt extruded at temperatures above 200° C. to form a polarizer film. Optical properties of this film including polarizing efficiency were measured according the procedure described in U.S. Pat. No. 5,071, 906 cited above. The film had a blue color with transmittance of about 40% and a polarizing efficiency of about 93% in the wavelength region 550–630 nm. Even after subjecting this film to an environment of 100° C. and 95% Relative Humidity ("R.H.") for about 120 hours, the polarizing efficiency stayed at about 92%, with virtually no change. For comparison, two commercially available polarizer films, one based on PVA and iodine and the other based on PVA and a dichroic dye, were tested under the same conditions. The polarizing efficiencies of these comparative films dropped off either totally or substantially after exposure to the above-noted heat/humidity environment, demonstrating the superior optical properties and thermal/humidity resistance of the inventive polarizer films over conventional polarizer films.

In addition to offering polarizers with superior properties, the present invention allows one to tailor-make polarizer films to suit different wavelengths. This is done by appropriately selecting the dye or dyes. The preferred process is a melt extrusion; no solvents are generally needed. Because of this advantage, the dye incorporation and distribution are likely to be much more uniform than in a solution-dipping process. Furthermore, the extrusion temperatures can be easily adjusted to suit different colorants and LCP compositions. Thus the inventive process is much more versatile than the conventional methods of preparing polarizer films. Additionally, the present invention advantageously offers superior liquid crystal display devices based on and incorporating the inventive polarizer films.

The following EXAMPLES are provided to further illustrate the present invention, but the invention is not to be construed as being limited thereto.

EXAMPLES

Example 1. Preparation of COTBPR

This example illustrates the preparation of COTBPR polyester from a 1 mole reaction mixture of 4-hydroxybenzoic acid ("HBA"), 6-hydroxy-2-naphthoic acid ("HNA"), terephthalic acid ("TA"), 4,4'-biphenol ("BP"), and resorcinol ("R") in the ratio 30:30:20:10:10.

To a 500 ml 3-neck flask equipped with a half-moon shaped TEFLON® stirrer blade, gas inlet tube, thermocouple, a Vigreux column attached to a condenser and receiver were added the following:

a) 41.440 grams of 4-hydroxybenzoic acid (0.3 moles);

b) 56.456 grams of 6-hydroxy-2-naphthoic acid (0.3 moles);

c) 33.226 grams of terephthalic acid (0.2 moles);

d) 18.600 grams of 4,4-biphenol (0.1 moles);

e) 11.012 grams of resorcinol (0.1 moles);

the flask was immersed in an oil bath and provided with means to accurately control the temperature. The flask was thoroughly purged of oxygen by evacuation and then flushed with nitrogen three times, and slowly heated in the oil bath; and f) 0.02 grams of potassium acetate was added as a catalyst along with 105.48 grams of acetic anhydride (2.5% excess). Acetic acid began to distill over and was collected in a graduated cylinder.

The contents of the flask were heated while stirring at a rate of 2000 rpm to 200° C. over a period of 60 minutes at which time 10 ml of acetic acid had been collected. The reaction temperature was then gradually raised at a rate of about 1° C./min to 320° C. at which time 96 ml of acetic acid had been collected. The flask was heated at 320° C. for another 60 min. A total of 110.5 ml of acetic acid had been collected. The flask was then evacuated to a pressure of 1.0 mbar at 320° C. while stirring. During this period the polymer melt continued to increase in viscosity while the remaining acetic acid was removed from the flask. The flask and its contents were removed from the oil bath and were allowed to cool to the ambient temperature. Polymer was then removed from the flask and a total of 120 grams of polymer was obtained.

The resulting polyester had an inherent viscosity (IV) of 2.0–2.4 dl/g as determined in a pentafluorophenol solution of 0.1 percent by weight concentration at 60° C. and a melt viscosity (MV) of 550 poise at a shear rate of $10^3$ $sec^{-1}$ measured at 230° C. in a capillary rheometer using an orifice of 1 mm diameter and 30 mm length.

When the polymer was subjected to differential scanning calorimetry (10° C./min heating rate), it exhibited a glass transition temperature (Tg) of 106° C. When the polymer was examined by hot-stage cross-polarized optical microscopy, it has a transition temperature from solid to liquid crystalline ($T_{s \to lc}$) at 170° C. The polymer melt was optically anisotropic.

Examples 2–14.

Following the procedure outlined in Example 1, the following additional variants of the COTBPR composition were prepared having different proportions of the five ingredients noted above for COTBPR. Composition, glass transition temperature, melt temperature ($T_m$, defined as the peak of a melt endotherm shown in differential scanning calorimetry ) and I.V. for the compositions appear in Table I below. Unless otherwise indicated, properties were measured as in Example 1. Table II lists polymers (EXAMPLES 15–22) which are not variants of COTBPR since they include additional monomers ("X" in Table II) or exclude some monomers of COTBPR ("--" in Table II).

TABLE I

| Example | HBA:HNA:TA:BP:R | Tg °C. | Tm °C. | $T_{s \to lc}$ °C. | I.V. (dl/g) |
| --- | --- | --- | --- | --- | --- |
| 1 | 30:30:20:10:10 | 106 | none | 170 | 2.5 |
| 2 | 20:30:25:15:10 | 108 | none | 280 | 2.74 |
| 3 | 30:20:25:15:10 | 107 | none | 275 | 2.12 |
| 4 | 40:10:25:15:10 | 106 | none | 255 | 1.96 |
| 5 | 30:10:30:20:10 | 111 | none | 280,385 | 2.64 |
| 6 | 20:20:30:20:10 | 108 | none | 350,385 | 2.74 |
| 7 | 10:30:30:20:10 | 113 | none | 290,400 | 2.48 |

TABLE I-continued

| Example | HBA:HNA:TA:BP:R | Tg °C. | Tm °C. | $T_{s \to lc}$ °C. | I.V. (dl/g) |
| --- | --- | --- | --- | --- | --- |
| 8 | 20:30:25:10:15 | 113 | none | 160 | 2.10 |
| 9 | 20:30:25:5:20 | 122 | none | 163 | 1.76 |
| 10 | 35:35:15:10:5 | 107 | 179 | 135 | 4.14 |
| 11 | 30:40:15:10:5 | 107 | 190 | 145 | 3.30 |
| 12 | 20:40:20:15:5 | 109 | 226 | 125 | 3.34 |
| 13 | 30:30:20:15:5 | 109 | 233 | 155 | 2.68 |
| 14 | 20:30:25:20:5 | 112 | 301 | 250 | 3.93 |

TABLE II

| Example | HBA:HNA:TA:BP:R:X | X |
| --- | --- | --- |
| 15 | 25:35:20:—:—:20 | Phenyl hydroquinone |
| 16 | 30:30:20:—:—:20 | Phenyl hydroquinone |
| 17 | 30:30:20:20:—:10 | Phenyl hydroquinone |
| 18 | 30:30:20:—:10:10 | Phenyl hydroquinone |
| 19 | 30:30:20:7:7:6 | Phenyl hydroquinone |
| 20 | 25:35:20:—:—:20 | Methyl hydroquinone |
| 21 | 30:30:20:10:—:10 | Methyl hydroquinone |
| 22 | 30:30:20:—:10:10 | Methyl hydroquinone |
| 23 | 30:30:20:5:10:5 | Acetaminophen |

Example 24. Preparation of Dye Blendend COTBPR by Melt Blending 60 grams of the COTBPR from Example 1 and 0.3 gram of Methylene Violet Bernthsen (from Aldrich Chemical Co., Milwaukee, Wis.) were charged into the mixing chamber of a Haake Mixer (Model # 3042309 from Haake Company, Paramus, N.J.). The mixing ball and its contents were heated to 240° C. over about 30 minutes and then the charge was blended at a rotational speed of 100 rpm for 10 minutes at the temperature. The mixture of polymer and dye was removed from the ball and allowed to cool to the ambient temperature.

Example 25. Extrusion of Film and Measurement of Properties 20 grams of the dyed polyester from Example 24 was compacted into a rod of ⅜ inch diameter. The rod was charged into the melting section of a micro fiber spinning unit (designed for internal use by Hoechst Celanese Corporation, Summit, N.J.). The polymer was melted and fed at a rate of 0.56 g/minute into a melt chamber. A slit die was located at the end of the melt chamber through which the polymer melt was extruded. The dimensions of the slit were ¼ inch by 5 thousandths of an inch. The extruding film was taken up by a take-up roll. During the spinning, the heater temperature was maintained at 230° C., the melt chamber temperature at 230° C. and the die temperature 235° C. The take-up speed of the film was 5 m/minute. The melt drawdown ratio, defined as the ratio of the take-up speed to the exit speed of the extruding film at the die exit, was 9. The width of the tape was 0.2 inches and the thickness 0.5 thousandths of an inch.

The obtained polarizing film had a blue color, a transmittance of 40%, and a polarizing efficiency ("polarizing coefficient") of 93% for light in the wavelength region 550–630 nm, as measured following the procedure detailed in U.S. Pat. No. 5,071,906 cited above. This polarizer film was allowed to stand in a humidity-controlled oven at 100° C. and 95% R.H. for 120 hours and the polarizing coefficient was determined again. The polarizing coefficient was found to be 92%, showing little change.

For comparison, the polarizing coefficients of two commercially available polarizing films, one based on PVA film and iodine (NPF-G1220DV from Nitto Denko Corporation, Japan) and the other based on PVA and a dichroic dye (NPF-Q-12 from Nitto Denko Corporation), were similarly determined. The two commercial films originally had polarizing coefficients 99.95% and 88%, respectively. After being allowed to stand in a humidity-controlled oven at 100° C. and 95% R.H. for 120 hours, the films showed significantly lowered polarizing coefficients of 0% and 40%, respectively, demonstrating thereby that the polarizer films of the present invention underwent far less degradation in their polarizing coefficient at 100° C. and 95% R.H., compared with conventional polarizing films.

What is claimed is:

1. A polarizing film having a polarizing efficiency of at least 70% and comprising a blend of a film-forming, wholly aromatic thermotropic liquid crystal polymer and a dichroic dye, with said liquid crystal polymer being a polyester which comprises repeat units corresponding to the formula:

$$-[P^1]_m-[P^2]_n-[P^3]_q-$$

wherein $P^1$, $P^2$, and $P^3$ represent monomeric moieties with $P^1$ being an aromatic hydroxy carboxylic acid, $P^2$ being an aromatic dicarboxylic acid, and $P^3$ being a phenol, with m, n and q representing mole percent of the respective monomers ranging from 5–70 mole percent individually.

2. The polarizing film of claim 1, wherein said repeat unit further comprises monomeric moieties $-[P^4]_r$- and $[P^5]_s$-, wherein $P^4$ represents a second aromatic hydroxy carboxylic acid different from $P^1$, $P^5$ represents a second phenolic moiety different from $P^3$, and r and s represent mole percent of the respective monomers ranging from 5–20 mole percent individually.

3. The polarizing film of claim 1, wherein $P^1$ is selected from the group consisting of 4-hydroxybenzoic acid, 2-hydroxy-6-naphthoic acid, and 4-carboxy-4'-hydroxy-1,1'-biphneyl.

4. The polarizing film of claim 1, wherein $P^2$ is selected from the group consisting of terephthalic acid, isophthalic acid, phthalic acid, 2-phenylterephthalic acid, 1,2-naphthalenedicarboxylic acid, 1,4-naphthalenedicarboxylic acid, 2,6-naphthalene dicarboxylic acid and 4,4'-biphenyldicarboxylic acid.

5. The polarizing film of claim 1, wherein $P^3$ is selected from the group consisting of resorcinol, hydroquinone, methyl hydroquinone, phenyl hydroquinone, catechol, 4,4'-dihydroxybiphenyl and acetaminophen.

6. The polarizing film of claim 2, wherein said $P^5$ is a diphenol selected from resorcinol, hydroquinone, catechol, 4,4'-dihydroxybiphenyl, bisphenol-A and acetaminophen.

7. The polarizing film of claim 3, wherein $P^1$ is 4-hydroxybenzoic acid.

8. The polarizing film of claim 3, wherein $P^1$ is 2-hydroxy-6-naphthoic acid.

9. The polarizing film of claim 4, wherein $P^2$ is terephthalic acid.

10. The polarizing film of claim 5, wherein $P^3$ is resorcinol.

11. The polarizing film of claim 5, wherein $P^3$ is 4,4'-dihydroxybiphenyl.

12. The polarizing film of claim 2, wherein said $P^4$ is 4-hydroxybenzoic acid.

13. The polarizing film of claim 6, wherein said $P^5$ is resorcinol.

14. The polarizing film of claim 1, wherein said dye is selected from the group consisting of straight chain dye, branched dye, direct dye, disperse dye, solvent dye and acidic dye.

15. The polarizing film of claim 1, wherein said dye is selected from the group consisting of azo dyes, anthraquinone dyes, Disperse Red, Blue 214, Red 60 and Yellow 56, Black 17, 19 and 154, Brown 44, 106, 195, 210, 242 and 247, Blue 1, 15, 22, 78, 90, 98, 151, 168, 202, 236, 249, and 270, Violet 9, 12, 51, and 98, Green 1 and 85, Yellow 8, 12, 44, 86, and 87, Orange 26, 39, 106 and 107, and Methylene violet Bernthsen.

16. The polarizing film of claim 15, wherein said dye is an anthraquinone dye.

17. The polarizing film of claim 1, wherein said blend is prepared by melt blending said polymer and said dye.

18. A polarizing film having a polarizing efficiency of at least 70% and comprising a blend of (a) a film-forming wholly aromatic thermotropic liquid crystal polyester which comprises 4-hydroxybenzoic acid, 6-hydroxy-2-naphthoic acid, terephthalic acid, 4,4'-dihydroxybiphenyl and resorcinol in a molar ratio 30:30:20:10:10 respectively, and (b) a dichroic dye.

19. A process of preparing a polarizer film-forming composition, which process comprises: (a) preparing a suitable film-forming, wholly aromatic thermotropic liquid crystal polymer and (b) blending said liquid crystal polymer with one or more suitable dichroic dyes by a suitable process to form the polarizer film-forming composition, with said liquid crystal polymer being a polyester or a polyesteramide, wherein said polyester comprises repeat units corresponding to the formula:

$$-[P^1]_m-[P^2]_n-[P^3]_q-$$

wherein $P^1$, $P^2$, and $P^3$ represent monomeric moieties with $P^1$ being an aromatic hydroxy carboxylic acid, $P^2$ being an aromatic dicarboxylic acid, and $P^3$ being a phenol; and further wherein said polyesteramide comprises repeat units corresponding to the formula:

$$-[P^4]_m-[P^5]_n-[P^6]_q-$$

wherein $P^4$, $P^5$, and $P^6$ represent monomeric moieties with $P^4$ being an aromatic amino carboxylic acid, $P^5$ being an aromatic dicarboxylic acid, and $P^6$ being a phenol; with m, n and q representing mole percent of the respective monomers ranging from 5–70 mole percent individually.

20. The process of claim 19, wherein said repeat units further comprise a second aromatic hydroxy carboxylic acid monomeric moiety different from $P^1$, and a second phenolic monomeric moiety different from $P^3$.

21. A polarizing film having a polarizing efficiency of at least 70% and comprising a blend of a film-forming, wholly aromatic thermotropic liquid crystal polymer and a dichroic dye, with said liquid crystal polymer being a polyesteramide which comprises repeat units corresponding to the formula:

$$-[P^1]_m-[P^2]_n-[P^3]_q-$$

wherein $P^1$, $P^2$, and $P^3$ represent monomeric moieties with $P^1$ being an aromatic amino carboxylic acid, $P^2$ being an aromatic dicarboxylic acid, and $P^3$ being a phenol with m, n and q representing mole percent of the respective monomers ranging from 5–70 mole percent individually.

22. The polarizer film of claim 21, wherein $P^1$ is 4-aminobenzoic acid.

* * * * *